C. A. VANDERVELL & A. H. MIDGLEY.
COMMUTATOR FOR DYNAMO MACHINES.
APPLICATION FILED MAY 6, 1913.
1,143,666.
Patented June 22, 1915.
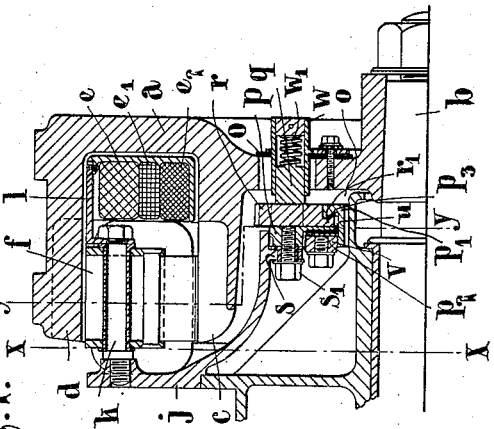

UNITED STATES PATENT OFFICE.

CHARLES ANTHONY VANDERVELL AND ALBERT HENRY MIDGLEY, OF ACTON VALE, ENGLAND.

COMMUTATOR FOR DYNAMO-MACHINES.

1,143,666.　　　　　Specification of Letters Patent.　　Patented June 22, 1915.

Application filed May 6, 1913. Serial No. 765,832.

*To all whom it may concern:*

Be it known that we, CHARLES ANTHONY VANDERVELL and ALBERT HENRY MIDGLEY, both subjects of the King of Great Britain and Ireland, and both residing at Warple Way, Acton Vale, in the county of Middlesex, England, have invented a certain new and useful Commutator for Dynamo-Machines, of which the following is a specification.

This invention relates to an improved construction of dynamo electric machines of the kind in which the armature and the commutator are stationary, and are used in conjunction with stationary slip rings and with rotary brushes.

The object of the present invention is to provide a simplified and more compact dynamo machine of the kind above referred to.

In the dynamo constructed according to the present invention the contact surface of the commutator is arranged in the same plane as the contact surface of the slip ring, and a single brush is used for simultaneously making contact with the commutator and the slip ring, so as to commutate and collect the current in a well known manner, and at the same time lead the collected current to the stationary slip ring.

The improved construction is illustrated in the accompanying drawings in connection with a machine having a stationary armature and stationary excitation windings arranged between an inner and an outer ring, provided on a flywheel and formed with polar projections which together with the excitation windings act as the magnet field system of the machine.

Figure 1 is a part side elevation of the machine shown in section partly along the line X—X of Fig. 2, and partly along the line Y—Y of the same figure, Fig. 2 is a cross section of the machine, and Fig. 3 a plan view thereof.

Referring to the accompanying drawings, $a$ is a flywheel or other rotary member mounted on an engine or other shaft $b$ and provided with two concentric annular flanges $c$ and $d$. The space between the flanges $c$ and $d$ is utilized to accommodate stationary field excitation windings $e$, $e_1$ and $e_2$ as well as the armature $f$ and the windings $f_1$ thereon, the parts of the annular flanges facing the armature being provided with suitable recesses and projections and the latter constituting the poles which together with the other parts of the flanges and the part of the flywheel surrounding the excitation windings form the magnetic field system. The arrangement of the magnetic field system is such that all the projections formed on the flange $c$ act as north poles N and all those formed on the flange $d$ as south poles S, the poles N on the flange $c$ lying opposite the recesses $h$ in the flange $d$ and the poles S on the latter flange lying opposite the recesses $i$ in the flange $c$. The armature which comprises an iron core constructed in the form of an annular ring and provided with notches adapted to receive the armature conductors $f_1$, is secured to a frame $j$ by means of bolts $k$, the frame $j$ forming part of the engine casing or being attached thereto. The field excitation windings $e_1$ and $e_2$ which act as main series windings, auxiliary series windings and shunt windings respectively, are arranged in front of the armature and are supported in a casing $l$ preferably of brass, which is suitably secured to the armature. The leading off wires $m_1$ of the excitation windings are passed through suitable holes $m$ formed in the iron core of the armature and provided with suitable bushes $n$ and are connected to the terminal contacts $N_1$ on the stationary frame $j$.

The commutator is attached to the stationary frame $j$ while the brushes are mounted on the flywheel $a$, thus rotating therewith. The commutator is preferably arranged to lie in the space $o$ between the engine shaft and the inner flange of the flywheel and it comprises two specially constructed slip rings $p$ and $p_1$ against the ends of which abut the positive and negative brushes $q$ and $q_1$ respectively, and commutator segments $r$ supported by said slip rings. The ring $p$ which is secured to a flange $s$ provided on the frame $j$ by means of fixing screws $s_1$ suitably insulated from said flange, is provided with a comb-like portion the teeth $t$ of which engage in spaces left free between the commutator segments, portions of which are cut away for this purpose and the end surfaces of the teeth being flush with the end surfaces of the commutator segments. The slip ring $p_1$ the end surface of which is also flush with the end surfaces of the commutator segments is provided with an extension $u$ passing through a ring $p_2$ provided on the slip ring $p$, said extension having a screw-threaded portion adapted to engage with an internally screw-threaded fixing ring $v$. The ring $p_1$ is also provided with a hooking flange $p_3$ adapted to engage with hooked portions $r_1$ formed on the commutator segments. The ring $v$ serves for clamping the slip ring $p_1$ and the commutator segments $r$ to the slip ring $p$ which is secured to the frame $j$. All the commutator segments are suitably insulated from the slip rings.

The positive and negative brushes are supported by two concentric plates $Q$ and $Q_1$ respectively secured to the flywheel by screws $R$ and $R_1$ and insulated therefrom by an insulating plate $O$, the brushes $q$ of one polarity being adapted to remain in contact with the teeth $t$ of the slip ring $p$ and with the commutator segments $r$ and the brushes $q_1$ of the other polarity with the other slip ring $p_1$ and commutator segments. Each brush is mounted in a brush holder $w$ and is pressed against the commutator by a spring $w_1$.

Having now described our invention, what we claim as new and desire to secure by Letters Patent is:—

1. A commutating and current collecting device for continuous current dynamos comprising a slip ring provided with teeth and commutator segments arranged between the teeth of said slip ring and insulated therefrom, the teeth of the slip ring and the commutator segments having their contact surfaces arranged in one and the same plane and a dynamo brush abutting against the commutator segments and the teeth of the slip ring, as and for the purposes set forth.

2. A commutating and current collecting device for continuous current dynamos comprising a slip ring provided with teeth, commutator segments arranged between the teeth of said slip ring and insulated therefrom, the teeth of the slip ring and the commutator segments having their contact surfaces arranged in one and the same plane, another slip ring engaging with the commutator segments insulated therefrom and arranged with its contact surface in the same plane as the contact surface of the commutator segments, a fixing ring for clamping the one slip ring to the other slip ring and for fixing the commutator segments in position and two concentric sets of brushes, one set of brushes abutting against the commutator segments and the teeth of one slip ring, and the other set of brushes against the other slip ring and the commutator segments, as and for the purposes set forth.

In testimony whereof we have signed our names to this specification in the presence of two subscribing witnesses.

CHARLES ANTHONY VANDERVELL.
ALBERT HENRY MIDGLEY.

Witnesses:
BERTRAM H. MATTHEWS,
WALTER J. SKERTEN.

Copies of this patent may be obtained for five cents each, by addressing the "Commissioner of Patents, Washington, D. C."